(12) United States Patent
Boben et al.

(10) Patent No.: US 11,908,079 B2
(45) Date of Patent: Feb. 20, 2024

(54) VARIABLE RATE TESSELLATION

(71) Applicant: QUALCOMM Incorporated, San Diego, CA (US)

(72) Inventors: Renju Boben, Alapuzha (IN); Kalyan Kumar Bhiravabhatla, Bengaluru (IN); Vishwanath Shashikant Nikam, Bangalore (IN); Suvam Chatterjee, Bangalore (IN); Ankit Kumar Singh, Bangalore (IN); Abhishek Lal, Bengaluru (IN); Sampathkumar Periasamy, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/658,634

(22) Filed: Apr. 8, 2022

(65) Prior Publication Data

US 2023/0326134 A1 Oct. 12, 2023

(51) Int. Cl.
*G06T 17/20* (2006.01)
*G06T 15/00* (2011.01)

(52) U.S. Cl.
CPC .......... *G06T 17/20* (2013.01); *G06T 15/005* (2013.01)

(58) Field of Classification Search
CPC .............................. G06T 17/20; G06T 15/005
See application file for complete search history.

(56) References Cited

U.S. PATENT DOCUMENTS

2013/0265309 A1* 10/2013 Goel ............... G06T 15/005
345/426
2017/0200308 A1 7/2017 Nguyen et al.
2017/0293995 A1 10/2017 Saleh et al.
2017/0358132 A1* 12/2017 Munshi ............... G06T 15/80
2019/0087992 A1 3/2019 Clarberg et al.
(Continued)

FOREIGN PATENT DOCUMENTS

EP 3349181 A1 7/2018
EP 3396636 A1 10/2018

OTHER PUBLICATIONS

Fisher M., et al., "DiagSplit", ACM Transactions on Graphics, NY, US, vol. 28, No. 5, Dec. 1, 2009, 10 Pages, XP058096150, ISSN: 0730-0301, DOI: 10.1145/1618452.1618496, Section 4.1 "Algorithm comparisons", Section 4.3 "DiagSplit Characteristics", Figures 1,2,3,9,10,11.

(Continued)

*Primary Examiner* — Michelle Chin
(74) *Attorney, Agent, or Firm* — Procopio, Cory, Hargreaves & Savitch

(57) ABSTRACT

This disclosure provides systems, devices, apparatus, and methods, including computer programs encoded on storage media, for variable rate tessellation. A graphics processor may receive data for geometry processing of a plurality of patches in a draw call. The graphics processor may reduce a tessellation factor of each of the plurality of patches based on a property of each of the plurality of patches. The reduced tessellation factor may correspond to a TRF. The property may correspond to a shading rate or a number of visible pixels. The graphics processor may apply the TRF for each of the plurality of patches. The graphics processor may render each of the plurality of patches based on the applied TRF for each of the plurality of patches.

30 Claims, 12 Drawing Sheets

(56) References Cited

U.S. PATENT DOCUMENTS

2019/0172247 A1     6/2019   Grossman et al.
2021/0150658 A1*    5/2021   Nijasure ............... G06F 9/4881
2021/0233501 A1     7/2021   Chaudhari et al.

OTHER PUBLICATIONS

International Search Report and Written Opinion—PCT/US2023/016147—ISA/EPO—dated Jun. 22, 2023.

* cited by examiner

VARIABLE RATE TESSELLATION

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address over tessellation in regions or primitives where the level of detail (LOD) may be reduced. There is a need for improved tessellation techniques where the LOD may be taken into account.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive data for geometry processing of a plurality of patches in a draw call. Each of the plurality of patches may include a plurality of primitives. Each of the plurality of primitives in each of the plurality of patches may include one or more sub-primitives. The apparatus may reduce a tessellation factor of each of the plurality of patches based on a property of each of the plurality of patches. The reduced tessellation factor may correspond to a tessellation reduction factor (TRF). The property may correspond to a shading rate or a number of visible pixels. The apparatus may apply the TRF for each of the plurality of patches. The apparatus may render each of the plurality of patches based on the applied TRF for each of the plurality of patches.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
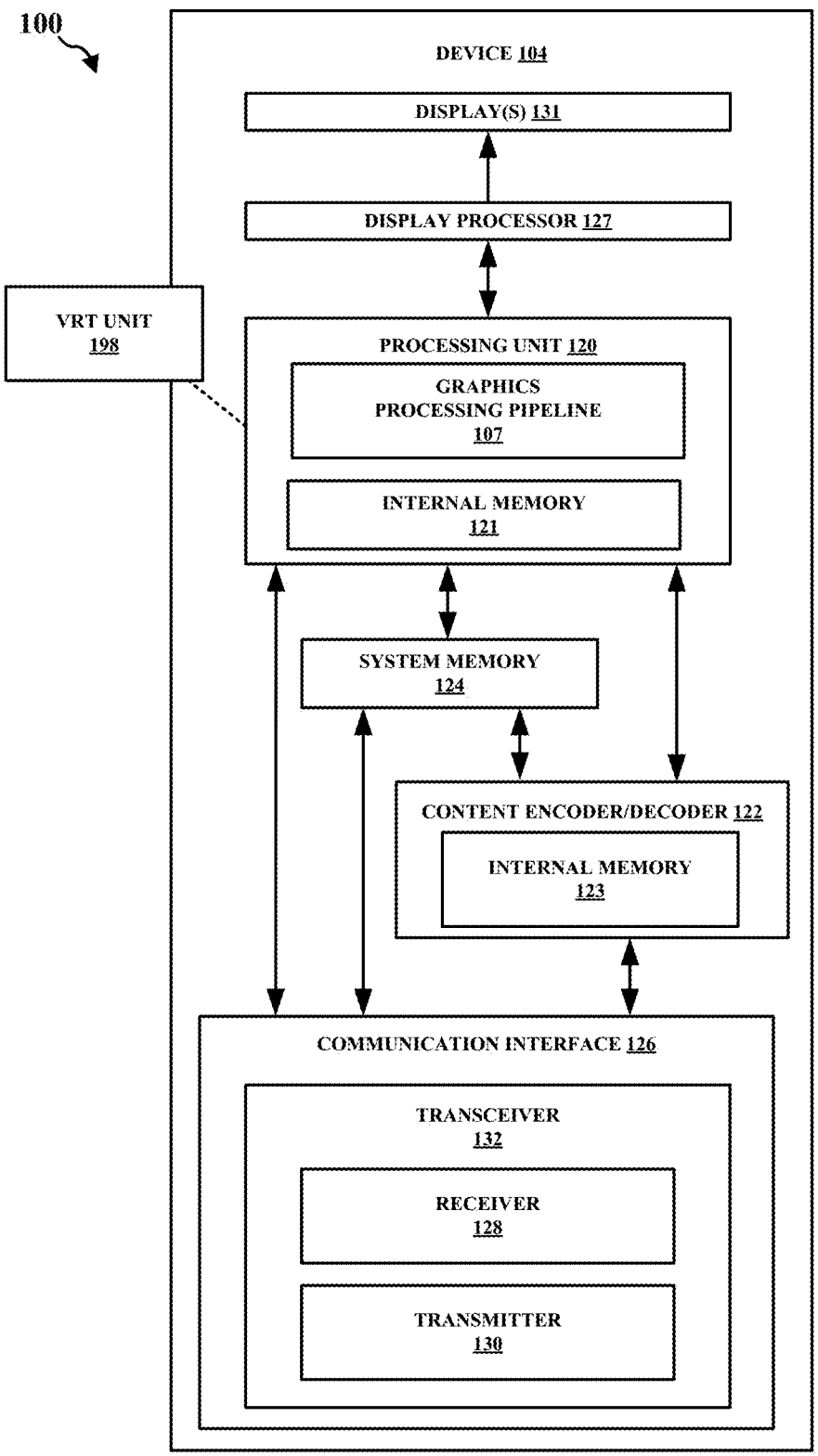
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In computer graphics, there may be a tradeoff between the level of detail (LOD) of a rendered image and performance of the rendering GPU (which may be measured in frames per second (FPS)). LOD may be reduced in certain parts of an image without much impact on the perceived quality of the image. By identifying such regions (e.g., patches) or draws and reducing the details in those regions or draws, performance of the rendering GPU may be improved. In one or more aspects, a variable rate tessellation (VRT) technique may use the shading rate from the variable rate shading (VRS) feature and/or the average pixel count per sub-primitive value to identify regions or draws where a low LOD may be used. The VRT technique may then reduce the tessellation rate of such regions or draws.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a VRT unit 198 configured to receive data for geometry processing of a plurality of patches in a draw call. Each of the plurality of patches may include a plurality of primitives. Each of the plurality of primitives in each of the plurality of patches may include one or more sub-primitives. The VRT unit 198 may be configured to reduce a tessellation factor of each of the plurality of patches based on a property of each of the plurality of patches. The reduced tessellation factor may correspond to a TRF. The property may correspond to a shading rate or a number of visible pixels. The VRT unit 198 may be configured to apply the TRF for each of the plurality of patches. The VRT unit 198 may be configured to render each of the plurality of patches based on the applied TRF for each of the plurality of patches. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each of the primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 2:
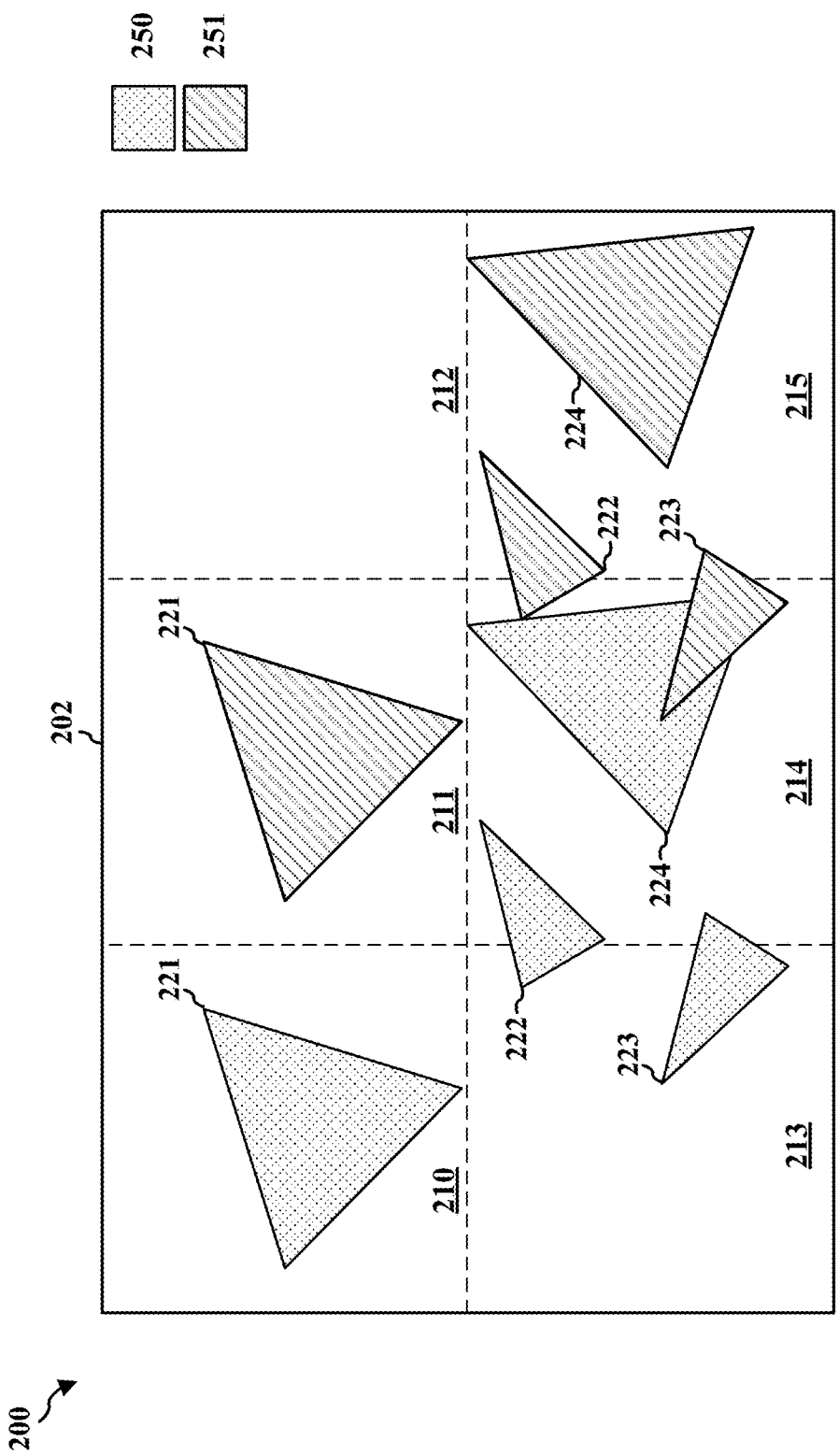
FIG. 2 illustrates an example image or surface in accordance with one or more techniques of this disclosure.

FIG. 2 illustrates image or surface 200, including multiple primitives divided into multiple bins in accordance with one or more techniques of this disclosure. As shown in FIG. 2, image or surface 200 includes area 202, which includes primitives 221, 222, 223, and 224. The primitives 221, 222, 223, and 224 are divided or placed into different bins, e.g., bins 210, 211, 212, 213, 214, and 215. FIG. 2 illustrates an example of tiled rendering using multiple viewpoints for the primitives 221-224. For instance, primitives 221-224 are in first viewpoint 250 and second viewpoint 251. As such, the GPU processing or rendering the image or surface 200 including area 202 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Figure 3:
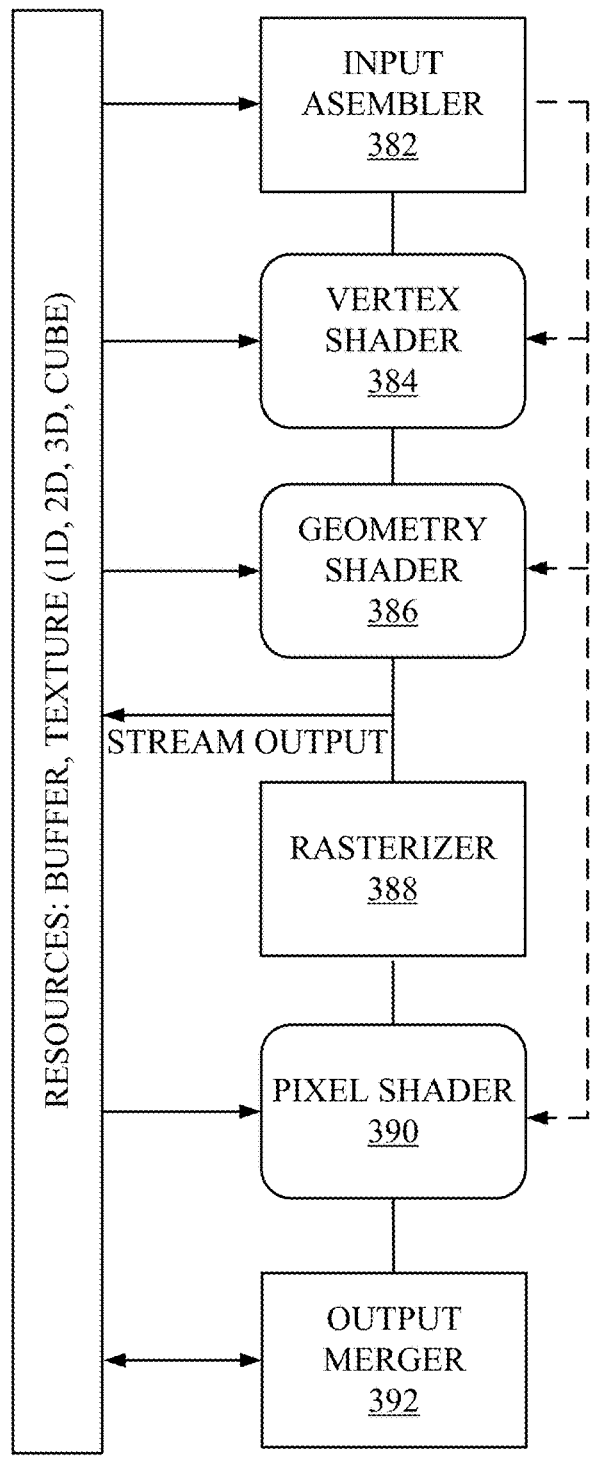
FIG. 3 is a block diagram illustrating a graphics processing pipeline in accordance with one or more techniques of this disclosure.

FIG. 3 is a block diagram illustrating a graphics processing pipeline 300. The pipeline 300 includes an input assembler stage 382, a vertex shader stage 384, a geometry shader stage 386, a rasterizer stage 388, a pixel shader stage 390, and an output merger stage 392. In some examples, an application program interface (API) may be configured to use each of the stages shown in FIG. 3. The graphics processing pipeline 400 is described below as being performed by the processing unit 120, but may be performed by a variety of other graphics processors.

Graphics processing pipeline 300 generally includes programmable stages (e.g., illustrated with rounded corners) and fixed function stages (e.g., illustrated with squared corners). For example, graphics rendering operations associated with certain stages of graphics rendering pipeline 300 are generally performed by a programmable shader processor, while other graphics rendering operations associated with other stages of graphics rendering pipeline 300 are generally performed by non-programmable, fixed function hardware units associated with the processing unit 120. Graphics rendering stages performed by shading units may generally be referred to as "programmable" stages, while stages performed by fixed function units may generally be referred to as fixed function stages. The indications herein of different stages being programmable stages or fixed function stages may be exemplary, and other combinations between programmable stages or fixed function stages may also be used.

Input assembler stage 382 is shown in the example of FIG. 3 as a fixed function stage and is generally responsible for supplying graphics data (e.g., triangles, lines, and points) to graphics processing pipeline 300. For example, input assembler stage 382 may collect vertex data for high order surfaces, primitives, and the like, and output vertex data and attributes to vertex shader stage 384. Accordingly, input assembler stage 382 may read vertices from an off-chip memory using fixed function operations. Input assembler stage 382 may then create pipeline work items from these vertices, while also generating vertex identifiers ("VertexIDs"), instance identifiers ("InstanceIDs," which are made available to the vertex shader) and primitive identifiers ("PrimitiveIDs," which are available to the geometry shader and pixel shader). Input assembler stage 382 may automatically generate VertexIDs, InstanceIDs, and PrimitiveIDs upon reading the vertices.

Vertex shader stage 384 may process the received vertex data and attributes. For example, vertex shader stage 384 may perform per-vertex processing such as transformations, skinning, vertex displacement, and calculating per-vertex material attributes. In some examples, vertex shader stage 384 may generate texture coordinates, vertex color, vertex lighting, fog factors, and the like. Vertex shader stage 384 generally takes a single input vertex and outputs a single, processed output vertex.

Geometry shader stage 386 may receive a primitive defined by the vertex data (e.g., three vertices for a triangle, two vertices for a line, or a single vertex for a point) and further process the primitive. For example, geometry shader stage 386 may perform per-primitive processing such as silhouette-edge detection and shadow volume extrusion, among other possible processing operations. Accordingly, geometry shader stage 386 may receive one primitive as an input (which may include one or more vertices) and output zero, one, or multiple primitives (which again may include one or more vertices). The output primitive may contain more data than may be possible without geometry shader stage 386. The total amount of output data may be equal to the vertex size multiplied by the vertex count, and may be limited per invocation. The stream output from geometry shader stage 386 may allow primitives reaching this stage to be stored to the off-chip memory. The stream output is typically tied to geometry shader stage 386, and both may be programmed together (e.g., using an API).

Rasterizer stage 388 may be a fixed function stage that is responsible for clipping primitives and preparing primitives for pixel shader stage 390. For example, rasterizer stage 388 may perform clipping (including custom clip boundaries), perspective divide, viewport/scissor selection and implementation, render target selection, and primitive setup. In this way, rasterizer stage 388 may generate a number of fragments for shading by pixel shader stage 390.

Pixel shader stage 390 may receive fragments from rasterizer stage 388 and generates per-pixel data, such as color. Pixel shader stage 390 may also perform per-pixel processing such as texture blending and lighting model computation. Accordingly, pixel shader stage 390 may receive one pixel as an input and may output one pixel at the same relative position (or a zero value for the pixel).

Output merger stage 392 may be responsible for combining various types of output data (such as pixel shader values, depth information, and stencil information) to generate a final result. For example, output merger stage 392 may perform fixed function blend, depth, and/or stencil operations for a render target (pixel position). While described above in general terms with respect to vertex shader stage 384, geometry shader stage 386, and pixel shader stage 390, each of the foregoing descriptions may refer to one or more shading units designated by a GPU to perform the respective shading operations.

Certain GPUs may be unable to support all of the shader stages shown in FIG. 3. For example, some GPUs may be unable to designate shading units to perform more than two shading operations, due to hardware and/or software restrictions (e.g., a limited number of shading units and associated components). In an example, certain GPUs may not support operations associated with geometry shader stage 386. Rather, the GPUs may include support for designating shading units to perform vertex shader stage 384 and pixel shader stage 390. Thus, operations performed by shading units may adhere to the input/output interface associated with vertex shader stage 384 and pixel shader stage 390.

In addition, in some examples, introducing geometry shader stage 386 to the pipeline may result in additional reads and writes to a storage unit, relative to a graphics processing pipeline that does not include geometry shader stage 386. For example, as noted above, vertex shader stage 384 may write vertices out to off-chip memory. Geometry shader stage 386 may read these vertices (the vertices output by vertex shader stage 384) and write the new vertices, which are then pixel shaded.

Figure 4:
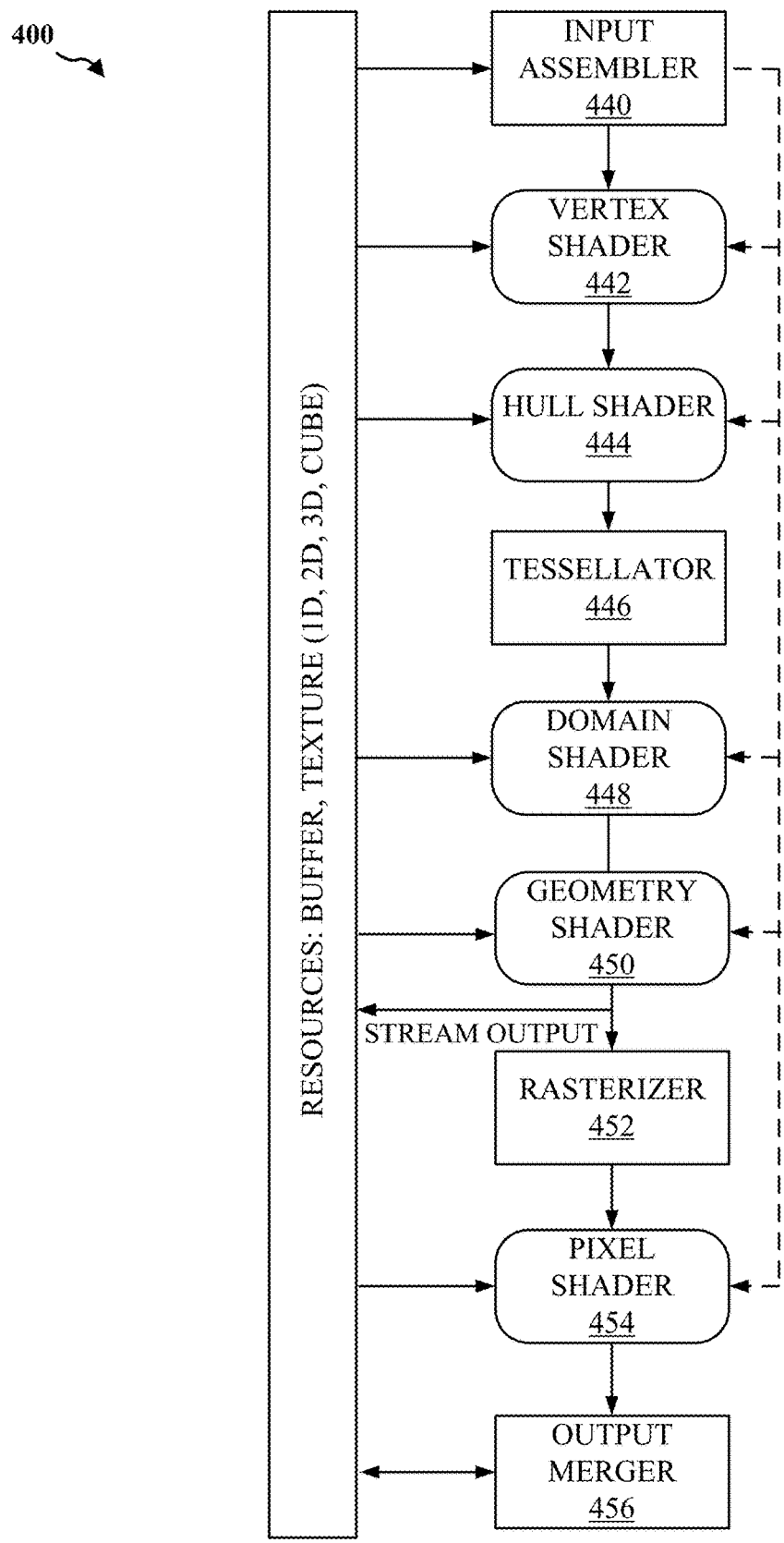
FIG. 4 is a block diagram illustrating an example graphics processing pipeline that includes tessellation stages in accordance with one or more techniques of this disclosure.

FIG. 4 is a block diagram illustrating an example graphics processing pipeline 400 that includes tessellation stages. For example, pipeline 400 includes an input assembler stage 440, a vertex shader stage 442, a hull shader stage 444, a tessellator stage 446, a domain shader stage 448, a geometry shader stage 450, a rasterizer stage 452, a pixel shader stage 454, and an output merger stage 456. In some examples, an API may be configured to use each of the stages shown in FIG. 4. The graphics processing pipeline 400 is described below as being performed by the processing unit 120, but may be performed by a variety of other graphics processors.

Certain stages shown in FIG. 4 may be configured similarly to or the same as the stages shown and described with respect to FIG. 3 (e.g., assembler stage 440, vertex shader stage 442, geometry shader stage 450, rasterizer stage 452, pixel shader stage 454, and output merger stage 456). In addition, pipeline 400 includes additional stages for hardware tessellation. For example, graphics processing pipeline 400 includes, in addition to the stages described above with respect to FIG. 3, hull shader stage 444, tessellator stage 446, and domain shader stage 448. That is, hull shader stage 444, tessellator stage 446, and domain shader stage 448 are included to accommodate tessellation by the processing unit 120, rather than being performed by a software application being executed, for example, by CPU.

Hull shader stage 444 may receive primitives from vertex shader stage 442 and may be responsible for carrying out at least two actions. First, hull shader stage 444 may be responsible for determining a set of tessellation factors. Hull shader stage 444 may generate tessellation factors once per primitive. The tessellation factors may be used by tessellator stage 446 to determine how finely to tessellate a given primitive (e.g., split the primitive into smaller parts). Hull shader stage 444 may also be responsible for generating control points that will later be used by domain shader stage 448. That is, for example, hull shader stage 444 may be responsible for generating control points that will be used by domain shader stage 448 to create actual tessellated vertices, which are eventually used in rendering.

When tessellator stage 446 receives data from hull shader stage 444, tessellator stage 446 may use one of several algorithms to determine an appropriate sampling pattern for the current primitive type. For example, in general, tessellator stage 446 may convert a requested amount of tessellation (as determined by hull shader stage 444) into a group of coordinate points within a current "domain." That is, depending on the tessellation factors from hull shader stage 444, as well as the particular configuration of the tessellator stage 446, tessellator stage 446 may determine which points in a current primitive need to be sampled in order to tessellate the input primitive into smaller parts. The output of tessellator stage 446 may be a set of domain points, which may include barycentric coordinates.

Domain shader stage 448 may take the domain points, in addition to control points produced by hull shader stage 444, and use the domain points to create new vertices. Domain shader stage 448 can use the complete list of control points generated for the current primitive, textures, procedural algorithms, or anything else, to convert the barycentric "location" for each tessellated point into the output geometry that is passed on to the next stage in the pipeline. As noted above, certain GPUs may be unable to support all of the shader stages shown in FIG. 4. For example, some GPUs may be unable to designate shading units to perform more than two shading operations, due to hardware and/or software restrictions (e.g., a limited number of shading units and associated components). In an example, certain GPUs may not support operations associated with geometry shader stage 450, hull shader stage 444, and domain shader stage 448. Rather, the GPUs may include support for designating shading units to perform vertex shader stage 442 and pixel shader stage 454. Thus, operations performed by shading units may adhere to the input/output interface associated with vertex shader stage 442 and pixel shader stage 454.

In computer graphics, there may be a tradeoff between the LOD of a rendered image and the performance of the rendering GPU (which may be measured in FPS). In other words, when the LOD is high, the FPS number may drop. Conversely, performance may be improved by lowering the LOD. LOD may be reduced in certain parts of an image without much impact on the perceived quality of the image. By identifying such regions (e.g., patches) or draws and reducing the details in those regions or draws, performance of the rendering GPU may be improved.

Examples of regions or objects where a low LOD may be acceptable may include objects that are far from the camera, regions that are not in the focus of a user (e.g., the focus of a user's eye), moving objects (such objects may usually be motion blurred), or objects that are in a shadow or not lit adequately.

The number of primitives of rendered objects and the pixel shading rate of rasterized primitives may affect the LOD of a rendering operation.

The number of primitive in a draw or an object may be changed in the vertex shader stage of the graphics pipeline. It may not be advisable to vary the number of primitives specified by the developer, as doing so may create undesirable effects such as disruption of watertightness of the object or the draw (e.g., a set of watertight meshes may refer to meshes consisting of one closed surface). For tessellated primitives, the number of inner (or internal) tessellated primitives may be modified without breaking the watertightness of the draw. At times tessellation may generate a large number of sub-primitives, many of which may end up contributing very little to the quality of the image. The inner tessellation rate of such primitives may be reduced without much reduction in the image quality.

Figure 5B:
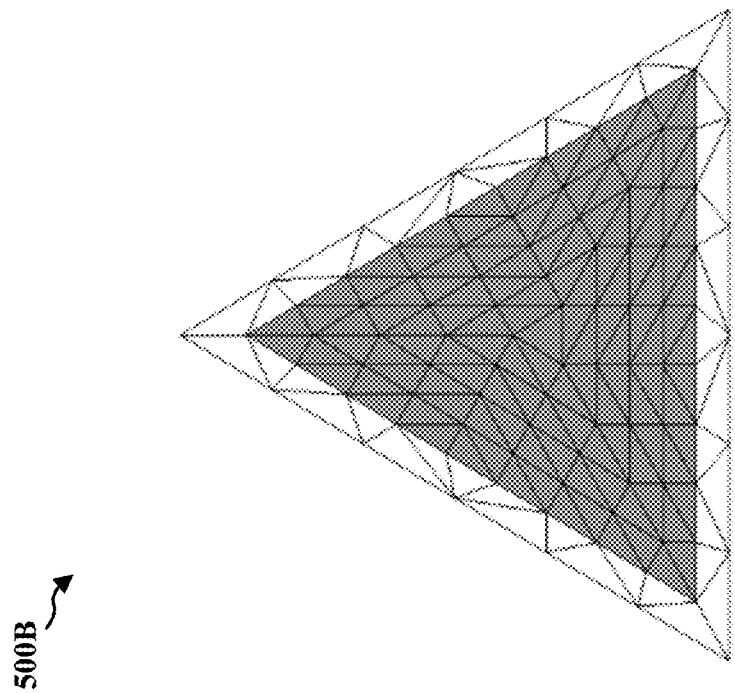
FIG. 5B illustrates a triangle primitive including sub-primitives generated based on tessellation at a higher tessellation factor in accordance with one or more techniques of this disclosure.
Figure 5A:
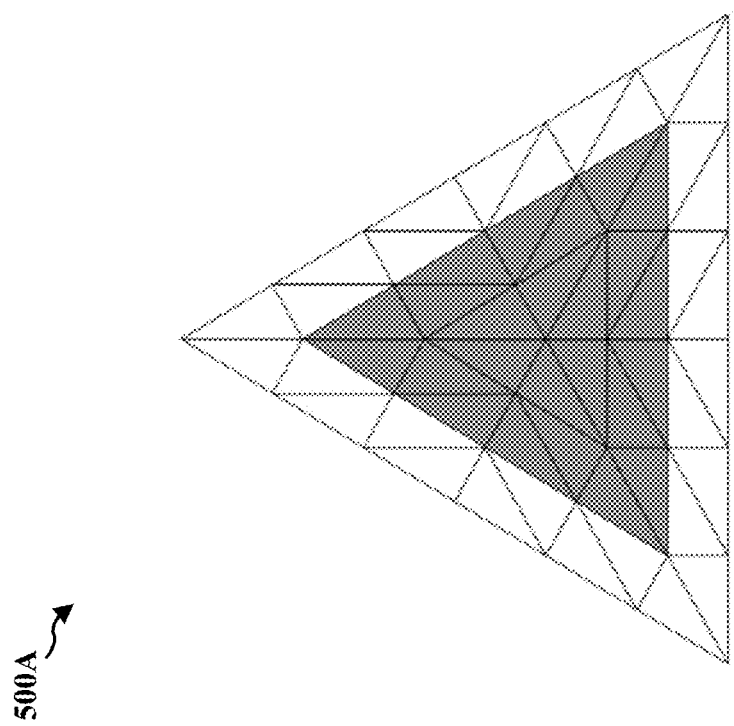
FIG. 5A illustrates a triangle primitive including sub-primitives generated based on tessellation in accordance with one or more techniques of this disclosure.

FIG. 5A illustrates a triangle primitive 500A including sub-primitives generated based on tessellation. The shaded sub-primitives may correspond to inner tessellated sub-primitives. The unshaded sub-primitives may correspond to outer tessellated sub-primitives. FIG. 5B illustrates a triangle primitive 500B including sub-primitives generated based on tessellation at a higher tessellation factor. The triangle primitive 500B may be the same as the triangle primitive 500A. Due to the higher tessellation factor, the triangle primitive 500B may include many more sub-primitives than the triangle primitive 500A. Similar to FIG. 5A, in FIG. 5B, the shaded sub-primitives may correspond to inner tessellated sub-primitives, and the unshaded sub-primitives may correspond to outer tessellated sub-primitives.

The tessellation rate may be specified by tessellation factors (TessFactors). TessFactors may indicate how many times the edges of a primitive may be sub-divided. There may be separate TessFactors for outer and inner edges (i.e., outer TessFactors and inner TessFactors).

In one or more aspects, a VRT technique may use the shading rate from the VRS feature and/or the average pixel count per sub-primitive value to identify regions or draws where a low LOD may be used. The VRT technique may then reduce the tessellation rate of such regions or draws.

The VRS may be an API feature, and may allow developers to specify different shading rates for different regions or draws of the frame. The shading rate may refer to the resolution at which pixel shaders (or fragment shaders) are called. Absent VRS, one pixel may be shaded per pixel/fragment shader operation. With VRS, a groups of nearby pixels may be shaded together in one operation. The group of pixels may be blocks of 1×2 (e.g., landscape orientation), 2×1 (e.g., portrait orientation), or 4×4 pixels, etc. In regions where the LOD specification is low, developers may reduce the shading rate. In other words, more pixels may be shaded in one shader operation. In one or more aspects, based on the VRT technique, if the shading rate is low, the tessellation rate may be reduced.

In one or more aspects, in addition to or in lieu of the VRS based shading rate, the VRT technique may also use a pixel count to identify the tessellation rate. In particular, primitives with low pixel counts per sub-primitive may be identified and the tessellation rate of such primitives may be reduced.

In one or more aspects, the tessellation operation may be performed in quadrilateral (quad) and triangle (tri) domains with triangle as the output primitive type.

In some examples, the inner TessFactors, but not the outer TessFactors, may be varied. In such examples, outer TessFactors may not be changed as doing so may disrupt the watertightness of the draw.

The tessellation reduction factor (TRF) may refer to the multiplicand with which the inner TessFactors may be multiplied in order to reduce the inner TessFactors. The TRF may fall in a certain range, e.g., the (0-1] range (i.e., excluding 0 and including 1). When the TRF is 1, the original TessFactors may be retained.

The VRT technique may not be used when the geometry shader is enabled. As described above, the geometry shader may take one primitive as an input, and may output multiple primitives. Since the number of input primitives to the geometry shader may be reduced based on the VRT, if the VRT is used along with the geometry shader, the output image may vary considerably. The geometry shader and tessellation may rarely be enabled together.

Per draw and per primitive VRT techniques may be used in both tile-based (binning) or direct rendering architectures. Screen space image-based and pixel count-based VRT technique may be used in the tile based architecture. Per draw, per primitive, screen-space image-based and pixel count-based approaches may be explained in further detail below.

In one or more aspects, as part of the VRT, the TRF may be identified based on the shading rate (e.g., the pixel pattern) that may be received from the VRS feature. Table 1 below may provide the TRF corresponding to different shading rates, according to one aspect.

TABLE 1

| Pixel Pattern (VRS) | Description | TRF |
| --- | --- | --- |
| 1x1 | no subsampling | 1 |
| 1x2 | 2x subsampled (landscape) | $\frac{1}{\sqrt{2}}$ |
| 2x1 | 2x subsampled (portrait) | $\frac{1}{\sqrt{2}}$ |
| 2x2 | 4x subsampled | $\frac{1}{2}$ |
| 1x4 | 4x subsampled (landscape) | $\frac{1}{2}$ |
| 4x1 | 4x subsampled (portrait) | $\frac{1}{2}$ |
| 2x4 | 8x subsampled (landscape) | $\frac{1}{\sqrt{8}}$ |
| 4x2 | 8x subsampled (portrait) | $\frac{1}{\sqrt{8}}$ |
| 4x4 | 16x subsampled | $\frac{1}{4}$ |

Here, the TRF may be selected such that the ratio of the number of pixels to the number of sub-primitives ((number of pixels)/(number of sub-primitives)) is retained (or the variation is kept to a minimum). In different configurations, the number of pixels may refer to the number of effective pixels or the number of visible pixels, as will be explained in further detail below. For example, consider the case in which the shading rate is 2×2 pixels. Accordingly, the effective pixel count may be reduced by a factor of 4, as 4 pixels may be grouped together to form 1 coarse (effective) pixel. To retain the same ratio of the number of (effective) pixels to the number of sub-primitives, the number of sub-primitives may be reduced by a factor of 4 as well. Since the number of sub-primitive may vary roughly to the square of internal TessFactors, the TRF may be selected as ½ in this case.

In the VRS feature, the shading rate may be specified at different granularities. These may include the per draw granularity, the per primitive (e.g., per provoking vertex) granularity, the per screen-space image granularity, or any combination of the above three granularities.

The VRT technique in relation to each of the shading rate granularities may be described in detail below. In particular, the VRT technique may use the VRS input to identify the internal TessFactors.

Figures 6A, 6B:
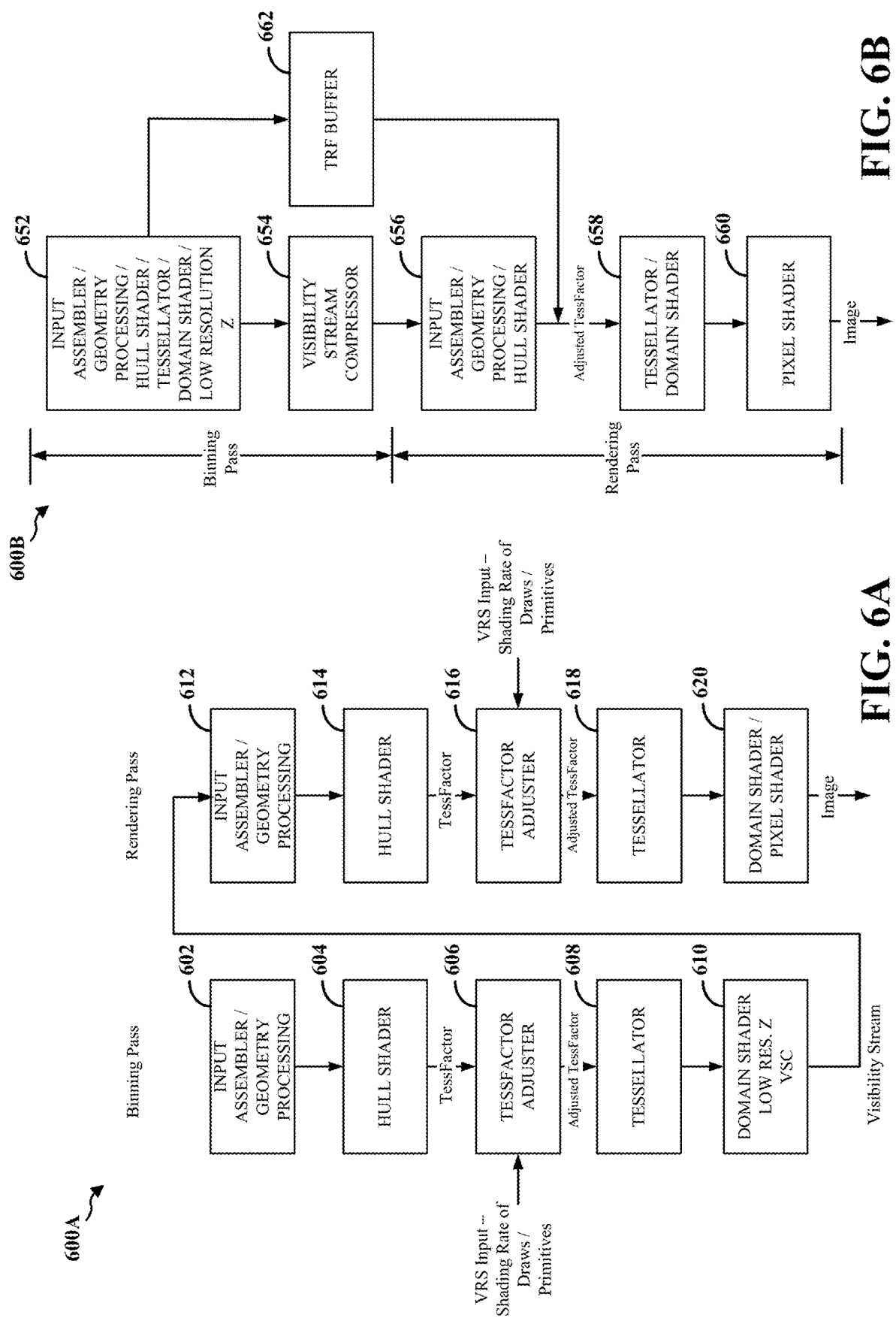
FIG. 6A is a block diagram illustrating a graphics processing pipeline where per draw or per primitive variable rate tessellation (VRT) is used in accordance with one or more techniques of this disclosure.
FIG. 6B is a block diagram illustrating a graphics processing pipeline where screen-space image-based or pixel count-based VRT is used in accordance with one or more techniques of this disclosure.

FIG. 6A is a block diagram illustrating a graphics processing pipeline 600A where per draw or per primitive VRT is used. The various stages may correspond to the same stages illustrated in FIGS. 3 and 4. In the binning (visibility) pass, block 602 may include the input assembler stage and the geometry processing stage. The block 604 may include the hull shader stage, which may generate and output the unmodified TessFactor. The block 606 may include the TessFactor adjuster stage, which may adjust the TessFactor based on the VRS input including the shading rate of the draws or primitives to output the adjusted TessFactor. The block 608 may include the tessellator stage, which may tessellate based on the adjusted TessFactor. The block 610 may include the domain shader stage, the low resolution Z (LRZ) stage, and the visibility stream compressor (VSC) stage. The block 610 may output the visibility stream, which may be processed in the rendering pass. In the rendering pass, block 612 may include the input assembler stage and the geometry processing stage. The block 614 may include the hull shader stage, which may generate and output the unmodified TessFactor. The block 616 may include the TessFactor adjuster stage, which may adjust the TessFactor based on the VRS input including the shading rate of the draws or primitives to output the adjusted TessFactor. The block 618 may include the tessellator stage, which may tessellate based on the adjusted TessFactor. The block 620 may include the domain shader stage and the pixel shader stage. The block 620 may output the rendered image.

In one aspect, using the VRS feature, a developer or an application may specify a per draw shading rate in the command buffer. The LOD specified for each draw may be identified based on this shading rate. The VRT technique may receive this shading rate (e.g., at blocks 606 and 616), and may apply the corresponding TRF to all the primitives in that draw call. In some examples, where the per draw shading rate is not specified direct through an API, the shading rate information may be obtained on a per draw or per patch basis for the same frame based on the binning pass. In further examples, the shading rate information may be obtained based on data from a previous frame.

The same TessFactor reduction technique may be applied in both binning (visibility) and rendering passes. Accordingly, the per draw VRT technique may save cycles in the hardware tessellator and the domain shader in both binning and rendering passes.

In one aspect, the VRS may allow developers to specify shading rates at a per primitive level (e.g., per provoking vertex (One of the vertices in an output primitive may be designated the provoking vertex, and this designation may be used by other processes (e.g., use outputs from the provoking vertex and not from other vertices))). The per primitive level shading rate may be specified along with the provoking vertex in the command buffer. If no shading rate is specified per primitive, a shading rate of 1×1 may be assumed.

Varying the per primitive tessellation rate may be similar to varying the per draw tessellation rate, with the difference being the granularity at which the VRT technique is applied. Here, the VRT technique may identify the TRF, and may modify the inner TessFactor of each primitive based on the shading rate of the primitive.

Similar to the per draw VRT, the per primitive VRT technique may also save cycles in the hardware tessellator and the domain shader in both binning (visibility) and rendering passes.

FIG. 6B is a block diagram illustrating a graphics processing pipeline 600B where screen-space image-based or pixel count-based VRT is used. The various stages may correspond to the same stages illustrated in FIGS. 3 and 4. In the binning (visibility) pass, block 652 may include the input assembler stage, the geometry processing stage, the hull shader stage, the tessellator stage, the domain shader stage, and the LRZ stage. The TRF for each of the draws or primitives may be generated at the block 652 and may be stored at a TRF buffer 662. The block 654 may include the visibility stream compressor stage. In the rendering pass, the block 656 may include the input assembler stage, the geometry processing stage, and the hull shader stage. The unmodified TessFactor provided by the hull shader stage may be adjusted based on the corresponding TRF value, which may be retrieved from the TRF buffer 662. The block 658 may include the tessellator stage and the domain shader stage. The tessellator stage may tessellate based on the adjusted TessFactor. The block 660 may include the pixel shader stage. The block 660 may output the rendered image.

In one aspect, in the VRS feature, using the screen-space image, developers may specify the shading rate of different regions of the frame. The shading rate may be specified for a block of pixel tiles, e.g., 8×8, 16×16, or 32×32 pixel tiles, as indicated by the VRS tile size. Depending on the shading rate, the VRT technique may assign a TRF to each tile.

Figure 7:
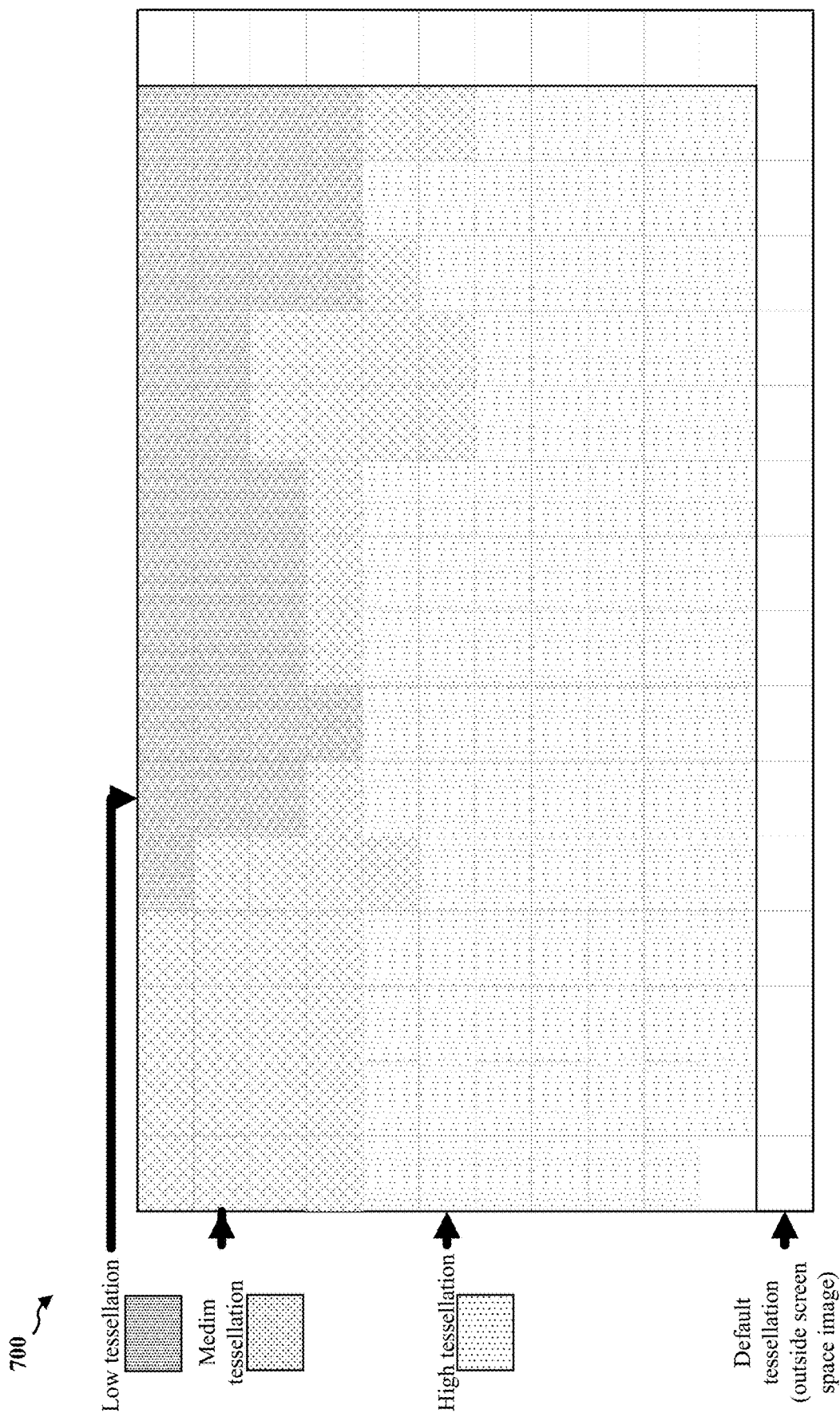
FIG. 7 is a diagram illustrating a screen space image overlapping with the frame in accordance with one or more techniques of this disclosure.

FIG. 7 is a diagram 700 illustrating a screen space image overlapping with the frame. The origin (e.g., top left point) of the screen-space image may be aligned with the origin (e.g., top left point) of the frame. If the frame is larger than the screen-space image, the spill over regions of the frame may have the TRF value set to '1' (i.e., no TessFactors reduction). Accordingly, in FIG. 7, based on the different LOD specification, the regions of the frame that are inside the screen-space image may be associated with a low tessellation rate (for a low LOD specification), a medium tessellation rate (for a medium LOD specification), or a high tessellation rate (for a high LOD specification). The low, medium, or high tessellation rates may be associated with low, medium, or high TRF values, respectively. The spill-over regions of the frame that are outside screen-space image may be associated with the default unmodified tessellation rate (i.e., the TRF value may be set to '1').

In the screen-space image-based VRT, in the block 652, the position of the primitive outputted from the tessellator may be available after, and not before, the geometry processing stage in the binning (visibility) pass. As a result, the VRT technique may not be applied in the binning (visibility) pass.

The LRZ stage, which may come after the geometry processing stage, may have access to both the screen-space image and the position of primitives on the frame. At this stage of the graphics pipeline, TRF values may be calculated, and may be assigned to each tile. From among the TRFs of the tiles associated with (e.g., at least partially covered by) a primitive, the highest TRF value may be selected as the TRF of the primitive.

Figure 8:
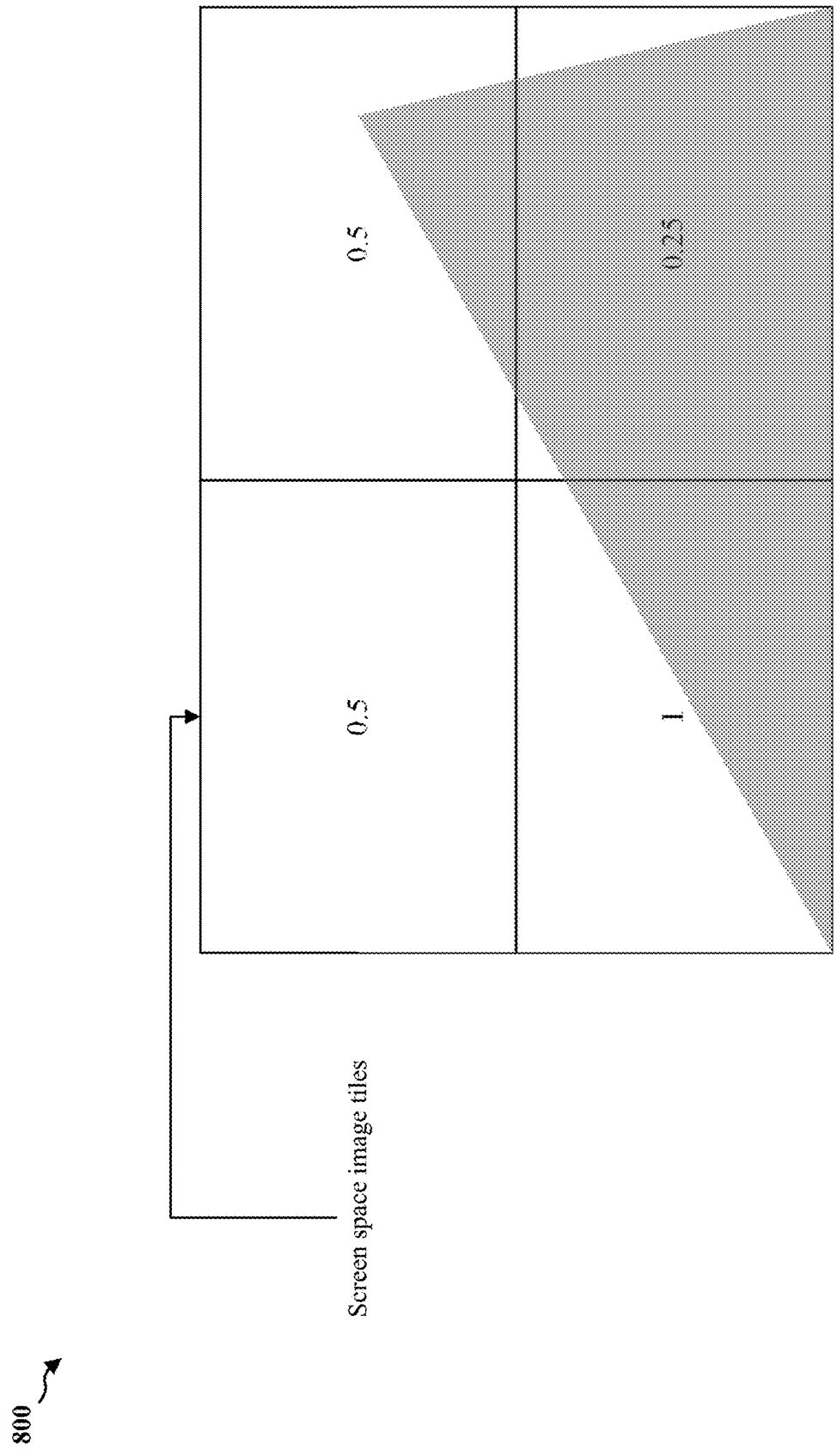
FIG. 8 is a diagram illustrating screen-space image tiles intersected with a triangle primitive in accordance with one or more techniques of this disclosure.

FIG. 8 is a diagram 800 illustrating screen-space image tiles intersected with a triangle primitive. The triangle primitive may be spread across 3 screen-space image tiles. The numbers ('0.5', '0.5', '1', and '0.25') may be the TRF value for the respective screen-space image tile. The highest TRF value (which may correspond to the least TessFactors reduction), which is '1' for the left bottom tile, may be selected as the TRF for the triangle primitive.

Referring back to FIG. 6B, the selected TRF value may be stored in the TRF buffer 662. In the rendering pass, for each tessellated primitive, the TRF may be retrieved from the TRF buffer 662 and TessFactors may be modified accordingly. The adjusted TessFactors may then be sent to the hardware tessellator.

The screen-space based VRT technique may save cycles in the hardware tessellator and the domain shader in the rendering pass (but not in the binning pass).

In one aspect, the VRT technique may be based on a pixel count. The tessellator sometimes may over tessellate primitives. More tessellation generally may result in a higher LOD. However, tessellating beyond a certain point may provide progressively smaller returns in image quality. For small primitives, the point of diminished return may be reached sooner. Primitives that are farther from the camera may be associated with higher depth values but with comparatively smaller bounding boxes. Therefore, heavy tessellation may not be desired for such primitives.

Some of the sub-primitives may be Z-culled or plane culled (i.e., the further away sub-primitives may be hidden by closer overlapping sub-primitives, and therefore may be removed). The culled sub-primitives may not contribute to the image quality. Primitives with a large number of culled sub-primitives may effectively be over tessellated.

The ratio of the number of pixels to the number of sub-primitives may a good indicator that may be used to identify over tessellation. A low value of this ratio may indicate that each sub-primitive, on an average, is housing few pixels.

In the pixel count-based VRT, the developer may specify a threshold value associated with the ratio of the number of visible pixels to the number of sub-primitives. For primitives with the ratio below the threshold, the number of sub-primitives may be reduced so that the ratio may become equal to the threshold.

The LRZ stage may include a counter for pixels per tile. Accumulating this value across all the tiles of the primitive may provide the total number of visible pixels of the primitive. Using the pixel count and the threshold value, a desired new sub-primitive count may be calculated as follows.

The desired new sub-primitive count, N_vrt=Number of Visible Pixels/Threshold

From N_vrt, the TRF of the primitive may be calculated using iterative methods (i.e., different TRF values may be tried in order to find a TRF value that yields a sub-primitive count closest to the desired new sub-primitive count, N_vrt,). This is explained in further detail below. A precise TRF value may be unnecessary for the VRT. Therefore, in some configurations, instead of using the above equation, less precise but simpler methods may also be used.

The TRF value of each primitive may be stored in the TRF buffer 662 at the end of the binning (visibility) pass. This TRF may be used to modify the TessFactors of primitives in the rendering pass.

The pixel count-based VRT technique may save cycles in the hardware tessellator and the domain shader in the rendering pass.

To explain the process for finding a TRF value that yields a sub-primitive count closest to the desired new sub-primitive count, N_vrt, some equations, functions, and variables may be defined as follows.

TF[x]=TessFactor[x], for edge x
P[x], Odd parity for edge x=

TABLE 2

| PARTITION | P[x] |
|---|---|
| INTEGER | If TF is odd then 1, else 0 |
| FRACTIONAL_ODD | 1 |
| FRACTIONAL_EVEN | 0 |

T[x]=⌈(TF[x]+P[x])/2⌉, for edge x ("⌈ ⌉" denotes the ceiling function) Variables to represent edges: b—bottom edge, l—left edge, t—top edge, r—right edge, i—inner edge (Tri domain), u—horizontal inner edge (Quad domain), and v—vertical inner edge (Quad domain).

Figure 9B:
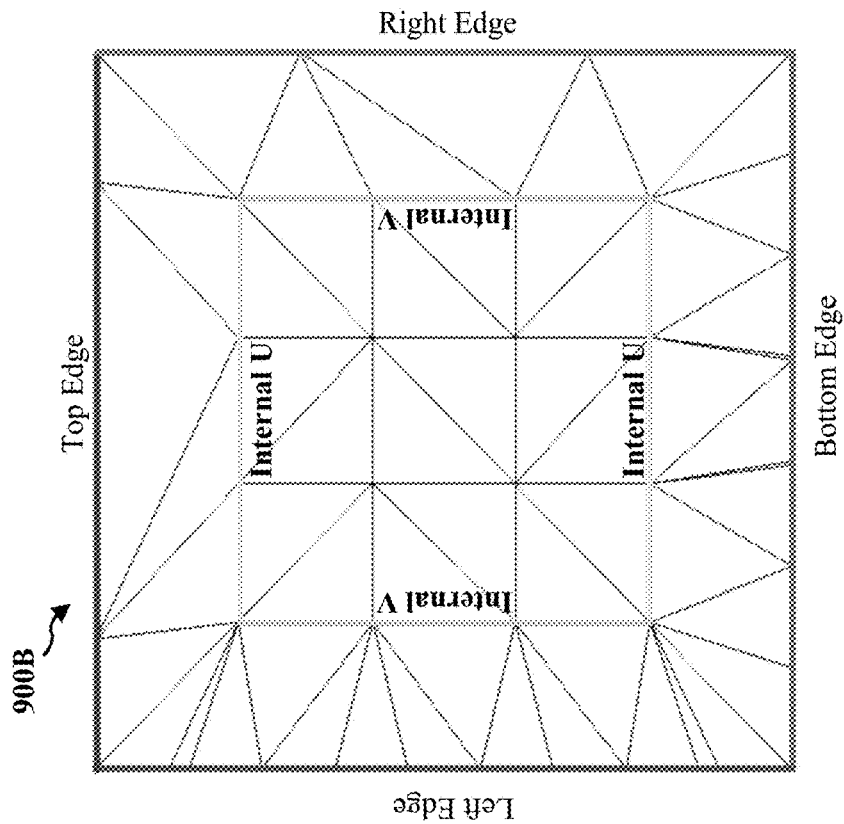
FIG. 9B is a diagram illustrating a quadrilateral primitive including triangle sub-primitives generated based on tessellation in accordance with one or more techniques of this disclosure.
Figure 9A:
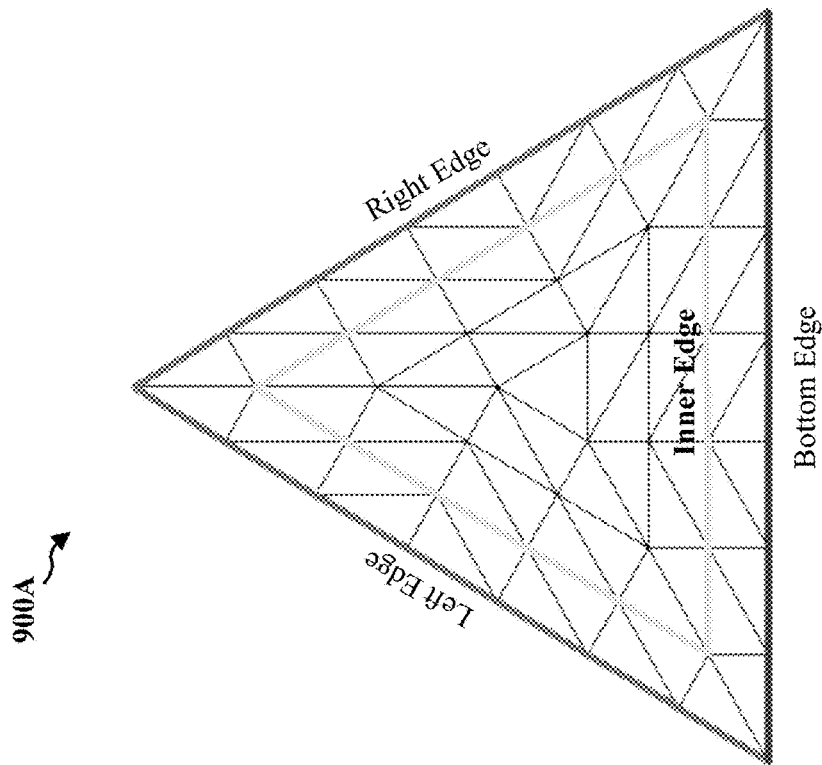
FIG. 9A is a diagram illustrating a triangle primitive including triangle sub-primitives generated based on tessellation in accordance with one or more techniques of this disclosure.

FIG. 9A is a diagram illustrating a triangle primitive 900A including triangle sub-primitives generated based on tessellation. The left edge (l), the right edge (r), the bottom edge (b), and the inner edge (i) are indicated in FIG. 9A. The number of triangle sub-primitives in a triangle primitive may be given by Equation [1] below.

The number of *sub*-primitives=2$T$[$b$]+2$T$[$l$]+2$T$[$r$]−$P$[$b$]−$P$[$l$]−$P$[$r$]+4$P$[$i$]+6$T$[$i$]($T$[$i$]−1−$P$[$i$])→   Equation [1]

FIG. 9B is a diagram illustrating a quadrilateral primitive 900B including triangle sub-primitives generated based on tessellation. The left edge (l), the right edge (r), the top edge (t), the bottom edge (b), the horizontal inner edges (u), and the vertical inner edges (v) are indicated in FIG. 9B. Further, a parameter c may be defined, where c may be 2 if P[u] & P[v] is equal to 1, or may be 0 if P[u] & P[v] is equal to 0. The number of triangle sub-primitives in a quadrilateral primitive may be given by Equation [2] below.

The number of *sub*-primitives=2$T$[$b$]+2$T$[$l$]+2$T$[$t$]+2$T$[$r$]−$P$[$b$]−$P$[$l$]−$P$[$t$]−$P$[$r$]+2$P$[$u$]+2$P$[$v$]−4$T$[$v$]($P$[$u$]+1)−4$T$[$u$]($P$[$v$]+1)+8$T$[$u$]$T$[$v$]+$c$→   Equation [2]

To solve for the TRF value for the triangle primitive 900A, Equation [1] may be used. All the external TessFactors may be known (e.g., they may be the same as that of the original primitive). Therefore, T[x] and P[x] for all external edges may be calculated.

The new internal TessFactors, TF[i] may be TF_original [i]*TRF. The values of T[i] and P[i] for the inner edges may be found based on iterations with different TRF values.

The sub-primitive count may be found based on Equation [1]. The TRF that gives the sub-primitive count closest to N_vrt may be selected.

If N_vrt is below or the same as the minimum possible value, then TRF may be set to 1. The minimum possible value for N_vrt may be the sub-primitive count when the internal TessFactor is set to 1 (i.e., TF[i]=1).

To solve for the TRF value for the quadrilateral primitive 900B, Equation [2] may be used. All the external TessFactors may be known (e.g., they may be the same as that of the original primitive). Therefore, T[x] and P[x] for all external edges may be calculated.

New internal TessFactors, TF[u] may be TRF*TF_original [u], and TF[v] may be TRF*TF_original [v]. The values of T[u], T[v], P[u], and P[v] for inner edges may be found based on iterations with different TRF values.

The sub-primitive count may be found based on Equation [2]. The TRF that gives the sub-primitive count closest to N_vrt may be selected.

If N_vrt is below or the same as the minimum possible value, then TRF may be set to 1. The minimum possible value for N_vrt may be the sub-primitive count when internal TessFactors are set to 1 (i.e., TF[u]=1 and TF[v]=1).

Figure 10:
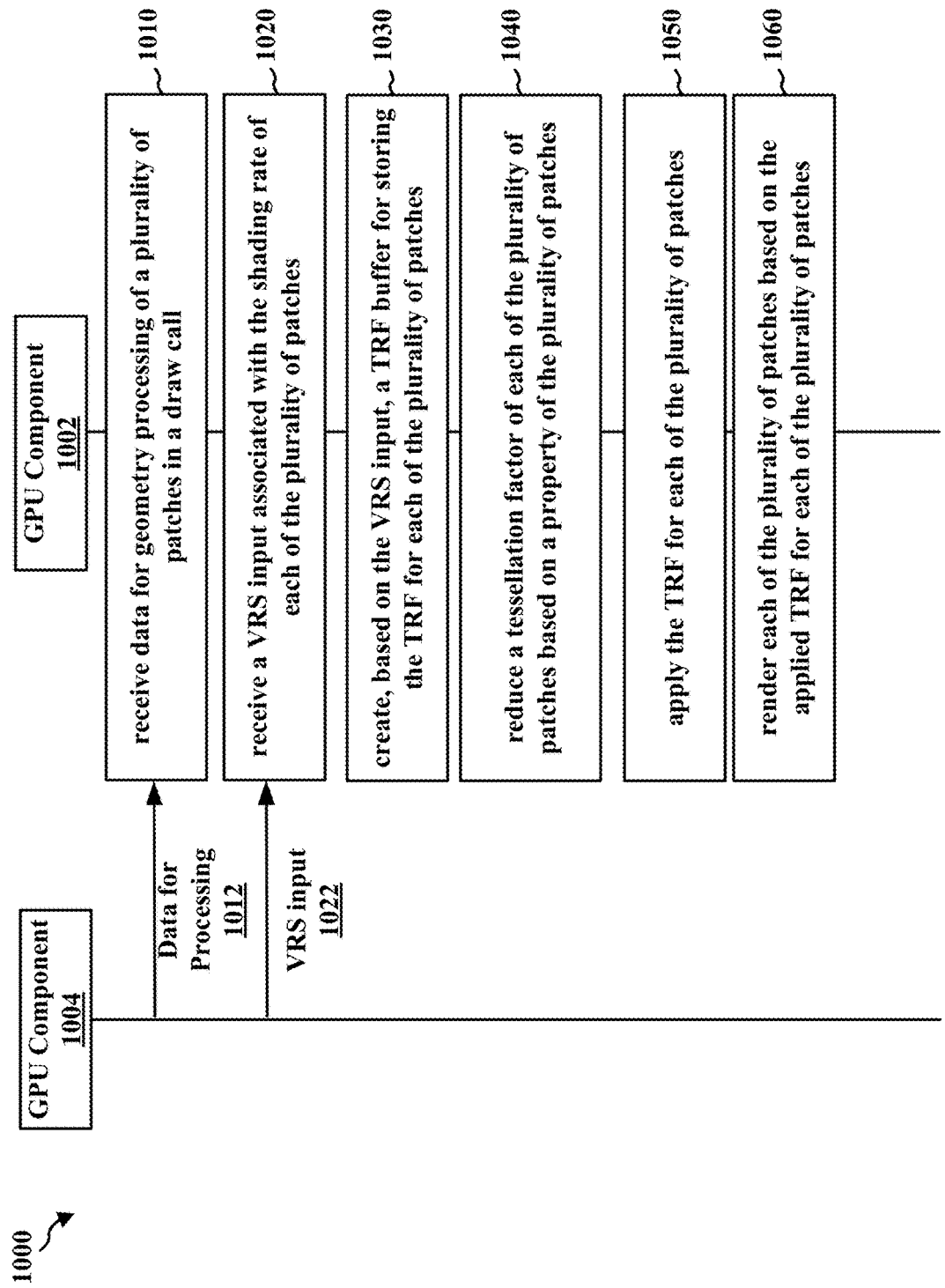
FIG. 10 is a call flow diagram illustrating example communications between a first GPU component and a second GPU component in accordance with one or more techniques of this disclosure.

FIG. 10 is a call flow diagram 1000 illustrating example communications between a first GPU component 1002 (e.g., a processing unit, a shading unit, a tessellator, etc.) and a second GPU component 1004 (e.g., a cache, a buffer, an internal memory, etc.) in accordance with one or more techniques of this disclosure. At 1010, the first GPU component 1002 may receive, from the second GPU component 1004, data 1012 for geometry processing of a plurality of patches in a draw call. Each of the plurality of patches may include a plurality of primitives. Each of the plurality of primitives in each of the plurality of patches may include one or more sub-primitives.

At 1020, the first GPU component 1002 may receive, from the second GPU component 1004, a VRS input 1022 associated with the shading rate of each of the plurality of patches. The tessellation factor of each of the plurality of patches may be reduced based on the VRS input.

In one configuration, the VRS input may be draw-based. The TRF for each of the plurality of patches may be a same TRF. In one configuration, the TRF for each of the plurality of patches may be applied in a binning pass or a rendering pass.

In one configuration, the VRS input may be primitive-based. A first TRF for at least one patch of the plurality of patches may be different from a second TRF for at least one other patch of the plurality of patches. In one configuration, the TRF for each of the plurality of patches may be applied in a binning pass or a rendering pass.

In one configuration, the VRS input may be image-based. At 1030, the first GPU component 1002 may create, based on the VRS input 1022, a TRF buffer for storing the TRF for each of the plurality of patches.

In one configuration, the TRF for each of the plurality of patches may be applied in a rendering pass. In one configuration, the plurality of primitives may include a first primitive associated with a plurality of tiles. A first TRF for the first primitive may correspond to a largest second TRF for the plurality of tiles.

At 1040, the first GPU component 1002 may reduce a tessellation factor of each of the plurality of patches based on a property of each of the plurality of patches. The property may correspond to a shading rate or a number of visible pixels.

At 1050, the first GPU component 1002 may apply the TRF for each of the plurality of patches.

At 1060, the first GPU component 1002 may render each of the plurality of patches based on the applied TRF for each of the plurality of patches.

In one configuration, the tessellation factor of each of the plurality of patches may be reduced such that a ratio of a number of effective pixels to a number of the one or more sub-primitives for each of the plurality of patches remains constant.

In one configuration, the TRF may be dynamically identified based on a ratio of the number of visible pixels to a number of the one or more sub-primitives within each of the plurality of patches. The TRF may be identified based on an iterative process.

In one configuration, one or more internal tessellation factors including the tessellation factor of each of the plurality of patches may be reduced. One or more external tessellation factors may not be reduced.

Figure 11:
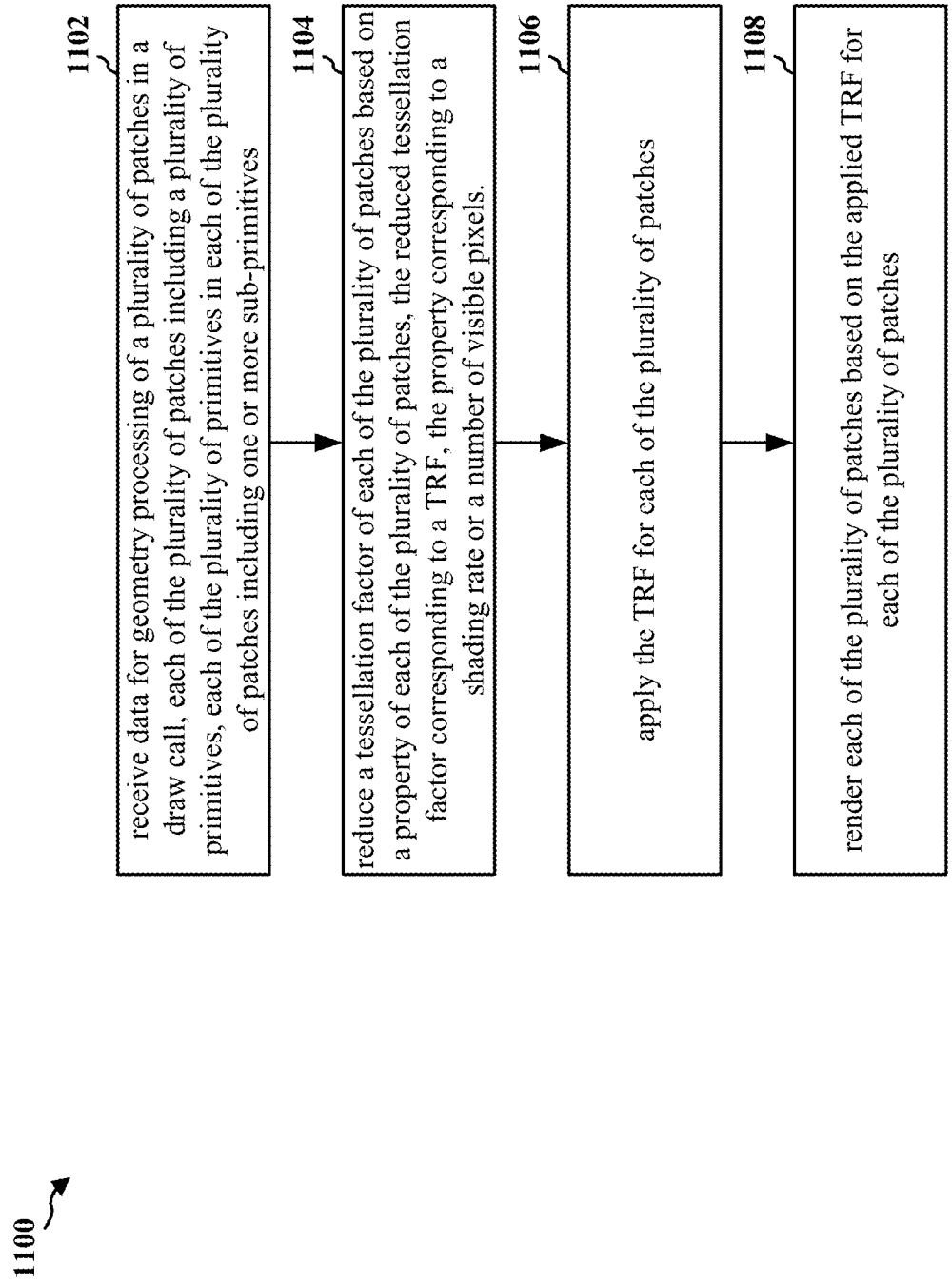
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-10.

At 1102, the apparatus may receive data for geometry processing of a plurality of patches in a draw call. Each of the plurality of patches may include a plurality of primitives. Each of the plurality of primitives in each of the plurality of patches may include one or more sub-primitives. Referring to FIG. 10, at 1010, the first GPU component 1002 may receive data 1012 for geometry processing of a plurality of patches in a draw call. Further, the processing unit 120 in FIG. 1 may perform the operation 1102.

At 1104, the apparatus may reduce a tessellation factor of each of the plurality of patches based on a property of each of the plurality of patches. The reduced tessellation factor may correspond to a TRF. The property may correspond to a shading rate or a number of visible pixels. Referring to FIG. 10, at 1040, the first GPU component 1002 may reduce a tessellation factor of each of the plurality of patches based on a property of each of the plurality of patches. Further, the processing unit 120 in FIG. 1 may perform the operation 1104.

At 1106, the apparatus may apply the TRF for each of the plurality of patches. Referring to FIG. 10, at 1050, the first GPU component 1002 may apply the TRF for each of the plurality of patches. Further, the processing unit 120 in FIG. 1 may perform the operation 1106.

At 1108, the apparatus may render each of the plurality of patches based on the applied TRF for each of the plurality of patches. Referring to FIG. 10, at 1060, the first GPU component 1002 may render each of the plurality of patches based on the applied TRF for each of the plurality of patches. Further, the processing unit 120 in FIG. 1 may perform the operation 1108.

Figure 12:
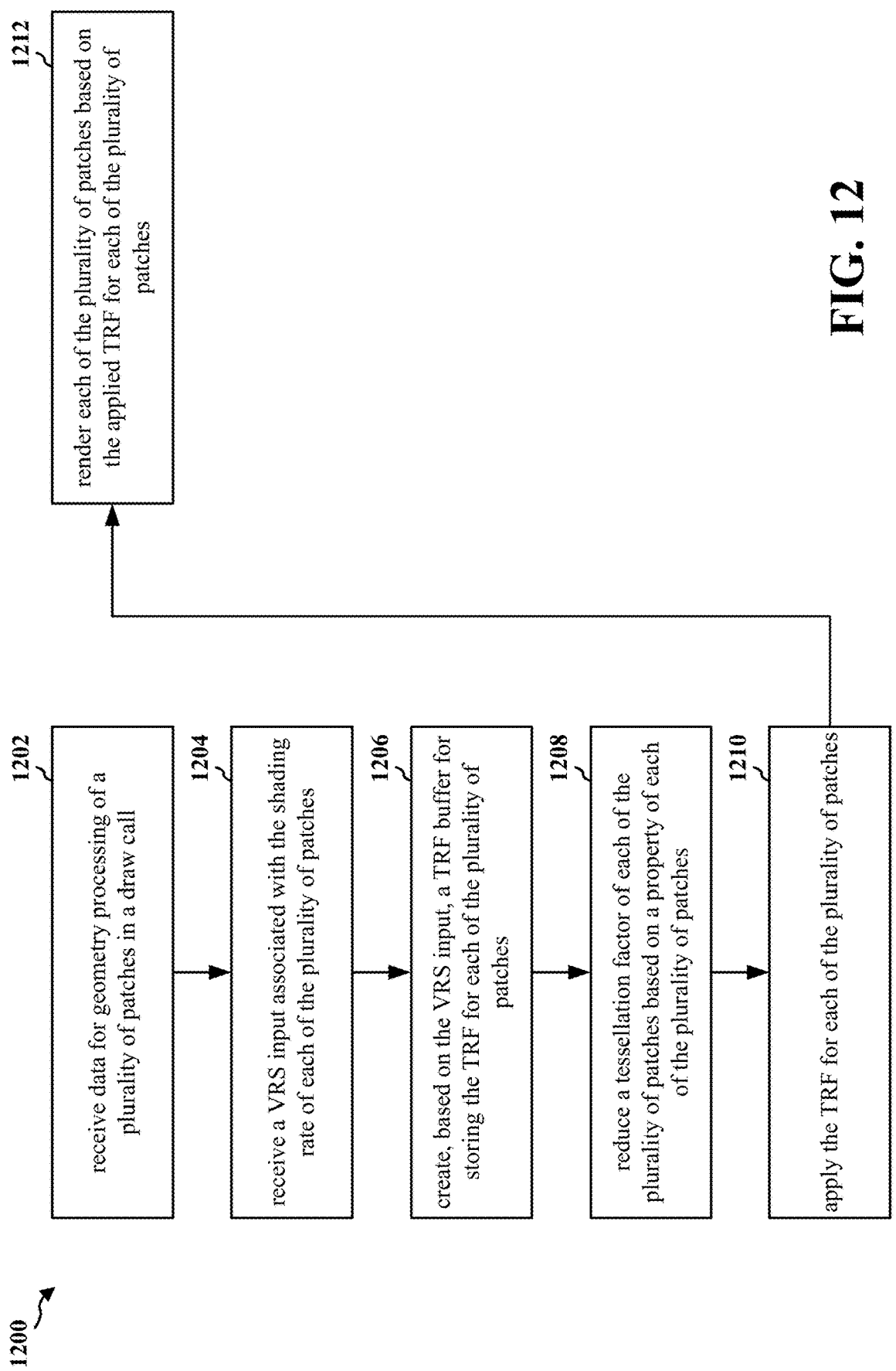
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-10.

At 1202, the apparatus may receive data for geometry processing of a plurality of patches in a draw call. Each of the plurality of patches may include a plurality of primitives. Each of the plurality of primitives in each of the plurality of patches may include one or more sub-primitives. Referring to FIG. 10, at 1010, the first GPU component 1002 may receive data 1012 for geometry processing of a plurality of patches in a draw call. Further, the processing unit 120 in FIG. 1 may perform the operation 1202. Moreover, block 652 in FIG. 6B may perform the operation 1202.

In one configuration, at 1204, the apparatus may receive a VRS input associated with the shading rate of each of the plurality of patches. The tessellation factor of each of the plurality of patches may be reduced based on the VRS input. Referring to FIG. 10, at 1020, the first GPU component 1002 may receive a VRS input 1022 associated with the shading rate of each of the plurality of patches. Further, the processing unit 120 in FIG. 1 may perform the operation 1204. Moreover, block 652 in FIG. 6B may perform the operation 1204.

In one configuration, the VRS input may be draw-based. The TRF for each of the plurality of patches may be a same TRF. In one configuration, the TRF for each of the plurality of patches may be applied in a binning pass or a rendering pass.

In one configuration, the VRS input may be primitive-based. A first TRF for at least one patch of the plurality of patches may be different from a second TRF for at least one other patch of the plurality of patches. In one configuration, the TRF for each of the plurality of patches may be applied in a binning pass or a rendering pass.

In one configuration, the VRS input may be image-based. At 1206, the apparatus may create, based on the VRS input, a TRF buffer for storing the TRF for each of the plurality of patches. Referring to FIG. 10, at 1030, the first GPU component 1002 may create, based on the VRS input 1022, a TRF buffer for storing the TRF for each of the plurality of patches. Further, the processing unit 120 in FIG. 1 may perform the operation 1206. Moreover, block 662 in FIG. 6B may perform the operation 1206.

In one configuration, the TRF for each of the plurality of patches may be applied in a rendering pass. In one configuration, the plurality of primitives may include a first primitive associated with a plurality of tiles. A first TRF for the first primitive may correspond to a largest second TRF for the plurality of tiles.

At 1208, the apparatus may reduce a tessellation factor of each of the plurality of patches based on a property of each of the plurality of patches. The reduced tessellation factor may correspond to a TRF. The property may correspond to a shading rate or a number of visible pixels. Referring to FIG. 10, at 1040, the first GPU component 1002 may reduce a tessellation factor of each of the plurality of patches based on a shading rate or a number of visible pixels of each of the plurality of patches. Further, the processing unit 120 in FIG. 1 may perform the operation 1208. Moreover, block 606 in FIG. 6A and/or block 658 in FIG. 6B may perform the operation 1208.

At 1210, the apparatus may apply the TRF for each of the plurality of patches. Referring to FIG. 10, at 1050, the first GPU component 1002 may apply the TRF for each of the plurality of patches. Further, the processing unit 120 in FIG. 1 may perform the operation 1210. Moreover, block 658 in FIG. 6B may perform the operation 1210.

At 1212, the apparatus may render each of the plurality of patches based on the applied TRF for each of the plurality of patches. Referring to FIG. 10, at 1060, the first GPU component 1002 may render each of the plurality of patches based on the applied TRF for each of the plurality of patches. Further, the processing unit 120 in FIG. 1 may perform the operation 1212. Moreover, block 660 in FIG. 6B may perform the operation 1212.

In one configuration, the tessellation factor of each of the plurality of patches may be reduced such that a ratio of a number of effective pixels to a number of the one or more sub-primitives for each of the plurality of patches remains constant.

In one configuration, the TRF may be dynamically identified based on a ratio of the number of visible pixels to a number of the one or more sub-primitives within each of the plurality of patches. The TRF may be identified based on an iterative process.

In one configuration, one or more internal tessellation factors including the tessellation factor of each of the plurality of patches may be reduced. One or more external tessellation factors may not be reduced.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for receiving data for geometry processing of a plurality of patches in a draw call. Each of the plurality of patches may include a plurality of primitives. Each of the plurality of primitives in each of the plurality of patches may include one or more sub-primitives. The apparatus may further include means for reducing a tessellation factor of each of the plurality of patches based on a property of each of the plurality of patches. The reduced tessellation factor may correspond to a TRF. The property may correspond to a shading rate or a number of visible pixels. The apparatus may further include means for applying the TRF for each of the plurality of patches. The apparatus may further include means for rendering each of the plurality of patches based on the applied TRF for each of the plurality of patches.

In one configuration, the tessellation factor of each of the plurality of patches may be reduced such that a ratio of a number of effective pixels to a number of the one or more sub-primitives for each of the plurality of patches remains constant.

In one configuration, the TRF may be dynamically identified based on a ratio of the number of visible pixels to a number of the one or more sub-primitives within each of the plurality of patches. The TRF may be identified based on an iterative process.

In one configuration, the apparatus may further include means for receiving a VRS input associated with the shading rate of each of the plurality of patches. The tessellation factor of each of the plurality of patches may be reduced based on the VRS input.

In one configuration, the VRS input may be draw-based. The TRF for each of the plurality of patches may be a same TRF.

In one configuration, the TRF for each of the plurality of patches may be applied in a binning pass or a rendering pass.

In one configuration, the VRS input may be primitive-based. A first TRF for at least one patch of the plurality of patches may be different from a second TRF for at least one other patch of the plurality of patches.

In one configuration, the TRF for each of the plurality of patches may be applied in a binning pass or a rendering pass.

In one configuration, the VRS input may be image-based. The apparatus may further include means for creating, based on the VRS input, a TRF buffer for storing the TRF for each of the plurality of patches.

In one configuration, the TRF for each of the plurality of patches may be applied in a rendering pass.

In one configuration, the plurality of primitives may include a first primitive associated with a plurality of tiles. A first TRF for the first primitive may correspond to a largest second TRF for the plurality of tiles.

In one configuration, one or more internal tessellation factors including the tessellation factor of each of the plurality of patches may be reduced. One or more external tessellation factors may not be reduced.

Referring back to FIGS. 6A-12, in the tessellation stage, the TessFactors may be reduced where the LOD is reduced based on the shading rate and/or the pixel count. There may not be pronounced reduction in the quality of the image even when TessFactors are significantly reduced. At the same time, the GPU rendering performance may be improved.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to receive data for geometry processing of a plurality of patches in a draw call, each of the plurality of patches including a plurality of primitives, each of the plurality of primitives in each of the plurality of patches including one or more sub-primitives; reduce a tessellation factor of each of the plurality of patches based on a property of each of the plurality of patches, the reduced tessellation factor corresponding to a TRF, the property corresponding to a shading rate or a number of visible pixels; apply the TRF for each of the plurality of patches; and render each of the plurality of patches based on the applied TRF for each of the plurality of patches.

Aspect 2 is the apparatus of aspect 1, where the tessellation factor of each of the plurality of patches is reduced such that a ratio of a number of effective pixels to a number of the one or more sub-primitives for each of the plurality of patches remains constant.

Aspect 3 is the apparatus of aspect 1, where the TRF is dynamically identified based on a ratio of the number of visible pixels to a number of the one or more sub-primitives within each of the plurality of patches, and the TRF is identified based on an iterative process.

Aspect 4 is the apparatus of any of aspects 1 and 2, the at least one processor being further configured to: receive a VRS input associated with the shading rate of each of the plurality of patches, where the tessellation factor of each of the plurality of patches is reduced based on the VRS input.

Aspect 5 is the apparatus of aspect 4, where the VRS input is draw-based, and the TRF for each of the plurality of patches is a same TRF.

Aspect 6 is the apparatus of aspect 5, where the TRF for each of the plurality of patches is applied in a binning pass or a rendering pass.

Aspect 7 is the apparatus of aspect 4, where the VRS input is primitive-based, and a first TRF for at least one patch of the plurality of patches is different from a second TRF for at least one other patch of the plurality of patches.

Aspect 8 is the apparatus of aspect 7, where the TRF for each of the plurality of patches is applied in a binning pass or a rendering pass.

Aspect 9 is the apparatus of aspect 4, where the VRS input is image-based, and the at least one processor is further configured to: create, based on the VRS input, a TRF buffer for storing the TRF for each of the plurality of patches.

Aspect 10 is the apparatus of aspect 9, where the TRF for each of the plurality of patches is applied in a rendering pass.

Aspect 11 is the apparatus of any of aspects 9 and 10, where the plurality of primitives includes a first primitive associated with a plurality of tiles, and a first TRF for the first primitive corresponds to a largest second TRF for the plurality of tiles.

Aspect 12 is the apparatus of any of aspects 1-11, where one or more internal tessellation factors including the tessellation factor of each of the plurality of patches are reduced, and one or more external tessellation factors are not reduced.

Aspect 13 is the apparatus of any of aspects 1-12, where the apparatus is a wireless communication device.

Aspect 14 is a method of wireless communication for implementing any of aspects 1-13.

Aspect 15 is an apparatus for graphics processing including means for implementing a method as in any of aspects 1-13.

Aspect 16 is a computer-readable medium storing computer executable code, the code when executed by at least one processor causes the at least one processor to implement a method as in any of aspects 1-13.

Various aspects have been described herein. These and other aspects are within the scope of the following claims.

What is claimed is:

1. An apparatus for graphics processing, comprising:
a memory; and
at least one processor coupled to the memory and configured to:
receive data for geometry processing of a plurality of patches in a draw call, each of the plurality of patches including a plurality of primitives, each of the plurality of primitives in each of the plurality of patches including one or more sub-primitives;
reduce a tessellation factor of each of the plurality of patches based on a property of each of the plurality of patches, the reduced tessellation factor corresponding to a tessellation reduction factor (TRF), the property corresponding to a shading rate or a number of visible pixels;
apply the TRF for each of the plurality of patches; and
render each of the plurality of patches based on the applied TRF for each of the plurality of patches.

2. The apparatus of claim 1, wherein the tessellation factor of each of the plurality of patches is reduced such that a ratio of a number of effective pixels to a number of the one or more sub-primitives for each of the plurality of patches remains constant.

3. The apparatus of claim 1, wherein the TRF is dynamically identified based on a ratio of the number of visible pixels to a number of the one or more sub-primitives within each of the plurality of patches, and the TRF is identified based on an iterative process.

4. The apparatus of claim 1, the at least one processor being further configured to:
receive a variable rate shading (VRS) input associated with the shading rate of each of the plurality of patches, wherein the tessellation factor of each of the plurality of patches is reduced based on the VRS input.

5. The apparatus of claim 4, wherein the VRS input is draw-based, and the TRF for each of the plurality of patches is a same TRF.

6. The apparatus of claim 5, wherein the TRF for each of the plurality of patches is applied in a binning pass or a rendering pass.

7. The apparatus of claim 4, wherein the VRS input is primitive-based, and a first TRF for at least one patch of the plurality of patches is different from a second TRF for at least one other patch of the plurality of patches.

8. The apparatus of claim 7, wherein the TRF for each of the plurality of patches is applied in a binning pass or a rendering pass.

9. The apparatus of claim 4, wherein the VRS input is image-based, and the at least one processor is further configured to:
 create, based on the VRS input, a TRF buffer for storing the TRF for each of the plurality of patches.

10. The apparatus of claim 9, wherein the TRF for each of the plurality of patches is applied in a rendering pass.

11. The apparatus of claim 9, wherein the plurality of primitives includes a first primitive associated with a plurality of tiles, and a first TRF for the first primitive corresponds to a largest second TRF for the plurality of tiles.

12. The apparatus of claim 1, wherein one or more internal tessellation factors including the tessellation factor of each of the plurality of patches are reduced, and one or more external tessellation factors are not reduced.

13. The apparatus of claim 1, wherein the apparatus is a wireless communication device.

14. A method of graphics processing, comprising:
 receiving data for geometry processing of a plurality of patches in a draw call, each of the plurality of patches including a plurality of primitives, each of the plurality of primitives in each of the plurality of patches including one or more sub-primitives;
 reducing a tessellation factor of each of the plurality of patches based on a property of each of the plurality of patches, the reduced tessellation factor corresponding to a tessellation reduction factor (TRF), the property corresponding to a shading rate or a number of visible pixels;
 applying the TRF for each of the plurality of patches; and
 rendering each of the plurality of patches based on the applied TRF for each of the plurality of patches.

15. The method of claim 14, wherein the tessellation factor of each of the plurality of patches is reduced such that a ratio of a number of effective pixels to a number of the one or more sub-primitives for each of the plurality of patches remains constant.

16. The method of claim 14, wherein the TRF is dynamically identified based on a ratio of the number of visible pixels to a number of the one or more sub-primitives within each of the plurality of patches, and the TRF is identified based on an iterative process.

17. The method of claim 14, further comprising:
 receiving a variable rate shading (VRS) input associated with the shading rate of each of the plurality of patches, wherein the tessellation factor of each of the plurality of patches is reduced based on the VRS input.

18. The method of claim 17, wherein the VRS input is draw-based, and the TRF for each of the plurality of patches is a same TRF.

19. The method of claim 18, wherein the TRF for each of the plurality of patches is applied in a binning pass or a rendering pass.

20. The method of claim 17, wherein the VRS input is primitive-based, and a first TRF for at least one patch of the plurality of patches is different from a second TRF for at least one other patch of the plurality of patches.

21. The method of claim 20, wherein the TRF for each of the plurality of patches is applied in a binning pass or a rendering pass.

22. The method of claim 17, wherein the VRS input is image-based, and the method further comprises:
 creating, based on the VRS input, a TRF buffer for storing the TRF for each of the plurality of patches.

23. The method of claim 22, wherein the TRF for each of the plurality of patches is applied in a rendering pass.

24. The method of claim 22, wherein the plurality of primitives includes a first primitive associated with a plurality of tiles, and a first TRF for the first primitive corresponds to a largest second TRF for the plurality of tiles.

25. The method of claim 14, wherein one or more internal tessellation factors including the tessellation factor of each of the plurality of patches are reduced, and one or more external tessellation factors are not reduced.

26. A non-transitory computer-readable medium storing computer executable code, the code when executed by at least one processor, causes the at least one processor to:
 receive data for geometry processing of a plurality of patches in a draw call, each of the plurality of patches including a plurality of primitives, each of the plurality of primitives in each of the plurality of patches including one or more sub-primitives;
 reduce a tessellation factor of each of the plurality of patches based on a property of each of the plurality of patches, the reduced tessellation factor corresponding to a tessellation reduction factor (TRF), the property corresponding to a shading rate or a number of visible pixels;
 apply the TRF for each of the plurality of patches; and
 render each of the plurality of patches based on the applied TRF for each of the plurality of patches.

27. The non-transitory computer-readable medium of claim 26, wherein the tessellation factor of each of the plurality of patches is reduced such that a ratio of a number of effective pixels to a number of the one or more sub-primitives for each of the plurality of patches remains constant.

28. The non-transitory computer-readable medium of claim 26, wherein the TRF is dynamically identified based on a ratio of the number of visible pixels to a number of the one or more sub-primitives within each of the plurality of patches, and the TRF is identified based on an iterative process.

29. The non-transitory computer-readable medium of claim 26, the code further causing the at least one processor to:
 receive a variable rate shading (VRS) input associated with the shading rate of each of the plurality of patches, wherein the tessellation factor of each of the plurality of patches is reduced based on the VRS input.

30. The non-transitory computer-readable medium of claim 29, wherein the VRS input is draw-based, and the TRF for each of the plurality of patches is a same TRF.

* * * * *